March 23, 1937.  C. B. COLE ET AL  2,074,459

BORING AND FACING TOOL HEAD

Filed May 17, 1934

C. B. Cole
Otto L. Lewis

Patented Mar. 23, 1937

2,074,459

UNITED STATES PATENT OFFICE 2,074,459

BORING AND FACING TOOL HEAD

Charles B. Cole, Berwyn, and Otto L. Lewis, Chicago, Ill.

Application May 17, 1934, Serial No. 726,058

8 Claims. (Cl. 77—58)

Our invention relates to boring and facing tool heads, such as are commonly used on or integral with a boring bar in turret lathes, boring machines, drill presses and other machine tools.

One of the objects of our invention is to provide a boring and facing head which will be of simple and rigid construction and which will be capable of speedy adjustment over a wide range of diameters.

Further objects and advantages of the invention will be apparent from the description and claims.

In the drawing, in which our invention is illustrated,

Figure 1:
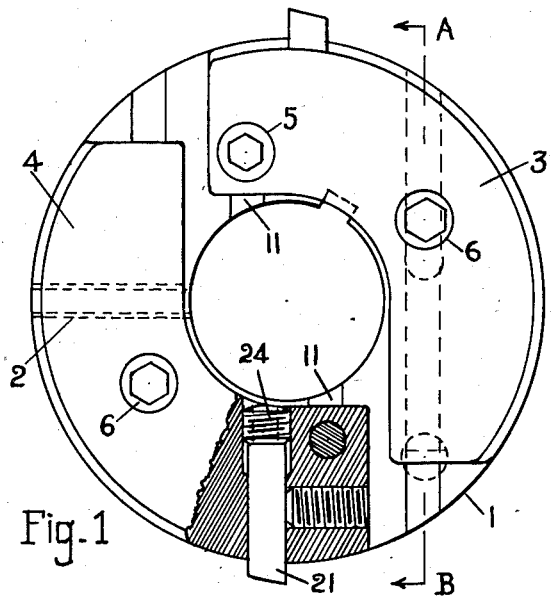
Figure 1 is a plan view of the assembled head, partly in section, to disclose the method of adjusting and clamping the cutting tool in its socket.
Figure 2:
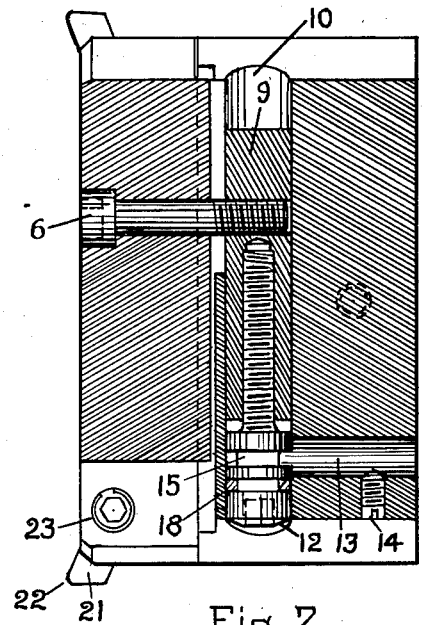
Fig. 2 is a side view of the assembled head, partly in section, the section being taken on plane A—B of Fig. 1.
Figure 3:
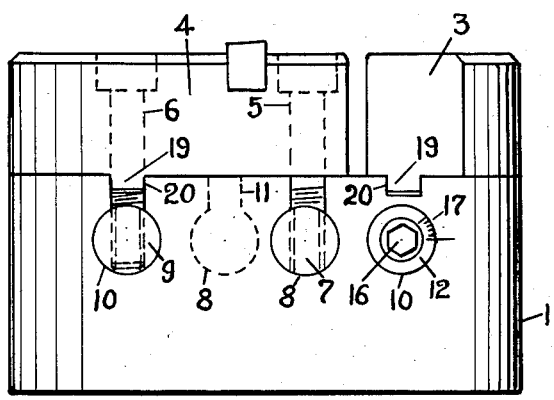
Fig. 3 is a front view of the assembled head, being an elevation of the view shown in Fig. 1.
Figure 5:
Fig. 5 is an end view of the nut shown in Fig. 4.
Figure 4:
Fig. 4 is a side elevation of the tool slide clamping nut.

Referring now to Figs. 1 to 4, incl., the construction shown comprises a body 1, bored and keywayed for mounting on a boring bar and retained on the bar by a set screw 2. Tool holders 3 and 4, which are similar, may be firmly clamped against the face of the body by countersunk head cap screws 5 and 6, the cap screws 5 engaging cylindrical nuts 7 which have a sliding fit in bores 8. Screws 6 engage tool slide adjusting nuts 9 which have a sliding fit in bores 10, the bores 10 being parallel and extending entirely through the body. Bores 8 are parallel with bores 10 and extend from the outside of the body to the shaft bore. Slots 11, central with the bores 8, permit screws 5 to move freely with tool slides 3 and 4 when they are adjusted inwardly or outwardly, the nuts 7 being moved along in bores 8 by screws 5. Tool slides 3 and 4 are adjusted inwardly and outwardly by adjusting screws 12 which are free to rotate in bores 10 but are held against endwise movement by keys 13 retained in the body 1 by set screws 14. The body of the key 13 is preferably cylindrical and one end is tongued to engage annular groove 15 in adjusting screw 12. Adjusting screw 12 is provided with a socket 16 for receiving a wrench and has graduations 17 for accurately indicating the travel of the tool slide. The inner ends of the adjusting screws 12 are accurately threaded to engage the adjusting nuts 9. An annular groove in the adjusting screws 12 retains a dirt-excluding ring 18, preferably of fibrous material. The tool slides 3 and 4 are provided with tongues 19 which have a sliding fit in grooves 20 in the body 1. At the tool end only of the slides, the grooves 20 are slotted through into the bores 10 so as to permit the screws 6 to travel in and out with the tool slides. It will be noted that the tool slides 3 and 4 are adjusted inwardly or outwardly by turning the adjusting screws 12, thereby causing the nuts 9 to move inwardly or outwardly, the motion of the nuts 9 being transferred by the screws 6 to the tool slides 3 and 4. Tool bits 21 are retained in suitable sockets in the tool slides 3 and 4, the sockets being inclined at such an angle that the cutting points 22 extend well beyond the faces of the tool slides, which permits the boring of blind holes. The tool bits 21 are clamped in their sockets by set screws 23 and backed up by hollow head set screws 24.

Further modifications will be apparent to those skilled in the art and it is desired, therefore, that our invention be limited only by the prior art and the scope of the appended claims.

Having thus described our invention, what we claim and desire to secure by Letters Patent is:

1. A boring and facing head construction comprising a rotatable supporting head having a cylindrical bore therein, the axis of which lies in a plane transverse to the axis of the head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, and screw-threaded means extending through said slide and threaded into said nut for drawing said nut and slide toward each other, said head having portions clamped between the nut and slide as the screw-threaded means are tightened.

2. A boring and facing head construction comprising a rotatable supporting head having a cylindrical bore therein, the axis of which lies in a plane transverse to the axis of the head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, and screw-threaded means for drawing said nut and slide toward each other, said head having portions clamped between the nut and slide as the screw-threaded means are tightened, said screw-threaded means comprising a screw swiveled in said slide and threaded into said nut.

3. A boring and facing head construction comprising a rotatable supporting head having a cylindrical bore therein, the axis of which lies in a plane transverse to the axis of the head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, screw-threaded means extending through said slide and threaded into said nut for drawing said nut and slide toward each other, said head having portions clamped between the nut and slide as the screw-threaded means are tightened, and means for adjusting the nut and tool slide comprising means for moving the nut longitudinally in its bore.

4. A boring and facing head construction comprising a rotatable supporting head having a cylindrical bore therein, the axis of which lies in a plane transverse to the axis of the head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, screw-threaded means extending through said slide and threaded into said nut for drawing said nut and slide toward each other, said head having portions clamped between the nut and slide as the screw-threaded means are tightened, and means for adjusting the nut and tool slide comprising means for moving the nut longitudinally in its bore, said nut-moving means comprising a screw swiveled in said head coaxial with said bore and threaded into said nut.

5. A boring and facing head construction comprising a rotatable supporting head having a cylindrical bore therein, the axis of which lies in a plane transverse to the axis of the head, a cylindrical nut fitting slidably in said cylindrical bore and lying within the cylindrical surface of the bore, a tool-carrying slide spaced from said nut, said supporting head and tool-carrying slide having cooperating guide means for guiding the slide to move parallel to the axis of said cylindrical bore, screw-threaded means for drawing said nut and slide toward each other, said head having portions clamped between the nut and slide as the screw-threaded means are tightened, said screw-threaded means comprising a screw swiveled in said slide and threaded into said nut, and means for adjusting the nut and tool slide comprising means for moving the nut longitudinally in its bore, said nut-moving means comprising a screw swiveled in said head coaxial with said bore and threaded into said nut.

6. A boring and facing head construction comprising a rotatable collar having a coaxial opening to receive a boring bar and having a cylindrical bore therethrough lying to one side of the axial opening, the axis of said cylindrical bore lying in a plane transverse to the axis of said head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, screw-threaded means extending through said slide and threaded into said nut for drawing said nut and slide toward each other, said head having portions clamped between the nut and slide as the screw-threaded means are tightened, and means for adjusting the nut and tool slide comprising means for moving the nut longitudinally in its bore.

7. A boring and facing head construction comprising a rotatable collar having a coaxial opening to receive a boring bar and having a cylindrical bore therethrough lying to one side of the axial opening, the axis of said cylindrical bore lying in a plane transverse to the axis of said head, a cylindrical nut fitting slidably in said cylindrical bore and lying entirely within the cylindrical surface of the bore, a tool-carrying slide spaced from said nut and recessed to receive a tool, said supporting head and tool-carrying slide having cooperating guide means for guiding the slide to move parallel to the axis of said cylindrical bore, screw-threaded means extending through said slide and threaded into said nut for drawing said nut and slide toward each other, said head having portions clamped between the nut and slide as the screw-threaded means are tightened, and means for adjusting the nut and tool slide comprising means for moving the nut longitudinally in its bore, said nut-moving means comprising a screw swiveled in said head coaxial with said bore and threaded into said nut.

8. A boring and facing head construction comprising a rotatable collar having a coaxial opening to receive a boring bar and having a cylindrical bore therethrough lying to one side of the axial opening, the axis of said cylindrical bore lying in a plane transverse to the axis of said head, a cylindrical nut fitting slidably in said cylindrical bore and lying within the cylindrical surface of the bore, a tool-carrying slide spaced from said nut said supporting head and tool-carrying slide having cooperating guide means for guiding the slide to move parallel to the axis of said cylindrical bore, screw-threaded means for drawing said nut and slide toward each other, said head having portions clamped between the nut and slide as the screw-threaded means are tightened, means for adjusting the nut and tool slide comprising means for moving the nut longitudinally in its bore, said head having a second cylindrical bore parallel to said first cylindrical bore extending from the periphery of the collar to said axial opening, a second cylindrical nut fitting and slidable in said second cylindrical bore and lying within the cylindrical surface of the bore and spaced from said slide, and a second screw-threaded means for drawing said second nut and slide toward each other, said head having portions clamped between said second nut and the slide as the screw-threaded means are tightened.

CHARLES B. COLE.
OTTO L. LEWIS.